(12) United States Patent
Chang (10) Patent No.: US 6,361,338 B1
(45) Date of Patent: Mar. 26, 2002

(54) ELECTRICAL CARD CONNECTOR

(75) Inventor: Jen-Jou Chang, Yung-Ho (TW)

(73) Assignee: Hon Hai Precision Ind. Co., Ltd., Taipei Hsien (TW)

(*) Notice: Subject to any disclaimer, the term of this patent is extended or adjusted under 35 U.S.C. 154(b) by 0 days.

(21) Appl. No.: 09/800,152

(22) Filed: Mar. 5, 2001

(30) Foreign Application Priority Data

Dec. 12, 2000 (TW) ..................................... 89221522 U (51) Int. Cl.[7] .............................................. H01R 13/62
(52) U.S. Cl. ...................................... 439/159; 439/923
(58) Field of Search ........................... 439/64, 159, 923, 439/637, 630

(56) References Cited

U.S. PATENT DOCUMENTS

| | | | | |
|---|---|---|---|---|
| 5,853,303 A | * | 12/1998 | Brunker et al. | 439/637 |
| 5,967,813 A | * | 10/1999 | Ho et al. | 439/159 |
| 6,033,243 A | * | 3/2000 | Kajiura | 439/159 |
| 6,095,835 A | * | 8/2000 | Oguchi | 439/159 |
| 6,102,720 A | * | 8/2000 | Tung | 439/159 |
| 6,113,403 A | * | 9/2000 | Oguchi | 439/159 |

* cited by examiner

Primary Examiner—Tulsidas Patel
(74) Attorney, Agent, or Firm—Wei Te Chung (57) ABSTRACT

An electrical card connector (1) includes an insulative housing (2), a number of electrical terminals (3), a card ejection element (4), a conductive shield (5), a switching element (6) and a pair of soldering elements (7). The insulative housing includes a base portion (20) and parallel first and second arms (22), (24). The electrical terminals are retained in the base portion. The switching element is assembled to the first arm and the soldering elements are retained in the first and second arms, respectively. The card ejection element is secured to the second arm and has a two-stroke mechanism which accepts an inserted electronic card on one inward push and ejects the electronic card from the electrical card connector on a second inward push.

22 Claims, 10 Drawing Sheets

— ELECTRICAL CARD CONNECTOR —

BACKGROUND OF THE INVENTION

1. Field of the Invention

The present invention relates to an electrical connector, and particularly to an electrical card connector.

2. Description of the Related Art

Electrical card connectors are mounted on printed circuit boards and electrically interconnect an electronic card received therein with the printed circuit board.

A conventional electrical card connector comprises a card receiving space defined by a bottom plate abutting against a printed circuit board on which the connector is mounted and a pair of arms. Electrical card connectors are required to meet more challenging requirements in accordance with the trend toward lighter, thinner, shorter, and smaller electronic devices in the electronic field. The thickness of conventional electrical card connectors with an electronic card received in the card receiving space and supported by the bottom plate is equal to or more than a sum of the thickness of the bottom plate and the thickness of the electronic card. The thickness of the conventional electrical card connector can not be further reduced because of the presence of this bottom plate.

Additionally, a conventional electrical card connector usually includes a card ejection element for ejecting the electronic card out of the card receiving space. The card ejection element comprises a sliding member and a guiding member guiding the movement of the sliding member. The guiding member is partially received in and stacked under the sliding member. The arrangement of the sliding and guiding members further increases the total thickness of the electrical card connector. Furthermore, the operation of the card ejection element is easily obstructed by the arrangement of its moveable components and therefore is not reliable.

Therefore, an improved electrical card connector is desired to overcome the disadvantages of the prior art.

SUMMARY OF THE INVENTION

A first object of the present invention is to provide an electrical card connector having a smaller thickness; and A second object of the present invention is to provide an electrical card connector having a more reliable card ejection element.

An electrical card connector in accordance with the present invention comprises an insulative housing, a plurality of electrical terminals, a card ejection element, a conductive shield, a switching element and a pair of soldering elements.

The insulative housing comprises an elongate base portion and first and second parallel arms extending outwardly from the base portion. The electrical terminals are retained in the base portion with two opposite ends thereof extending beyond the base portion. The base portion and the arms define a card receiving space therebetween for receiving an electronic card therein. The electrical card connector is mounted onto a printed circuit board which functions as a roof of the electrical card connector. The card ejection element is assembled to one of the first and second arms of the insulative housing. The card ejection element has a two-stroke mechanism which accepts an inserted electronic card on one stroke with a first inward pushing force and which ejects the electronic card out of the card receiving space with a second inward pushing force on a second stroke. The switching element provides an electrical switch function responsive to insertion and/or ejection of the electronic card. The soldering elements reliably mount the electrical card connector to the printed circuit board.

Other objects, advantages and novel features of the invention will become more apparent from the following detailed description of the present embodiment when taken in conjunction with the accompanying drawings.

DETAILED DESCRIPTION OF THE INVENTION

Figure 1:
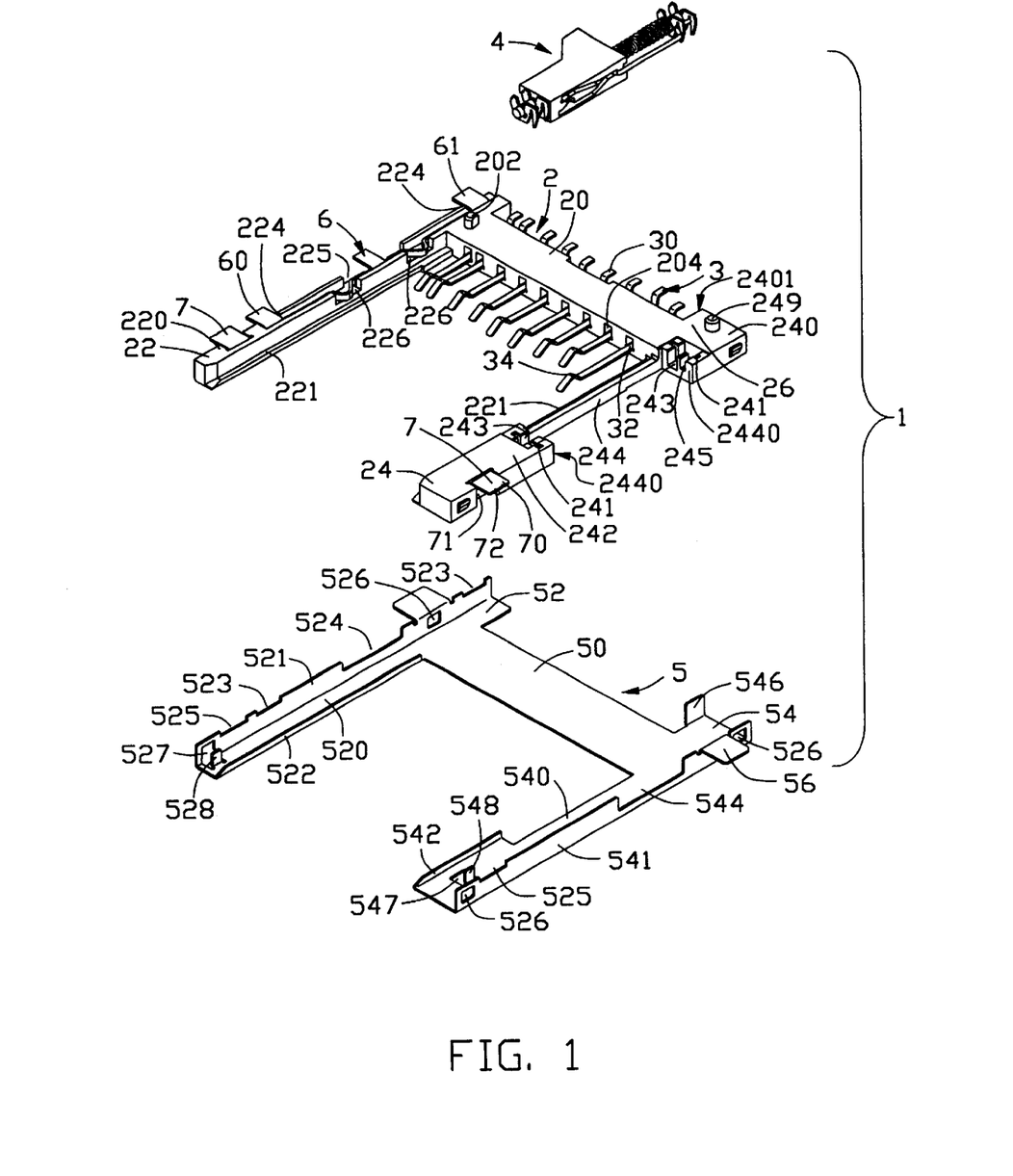
FIG. 1 is an exploded view of an electrical card connector in accordance with the present invention.

Referring to FIG. 1, an electrical card connector 1 in accordance with the present invention comprises an insulative housing 2, a plurality of electrical terminals 3, a card ejection element 4, a conductive shield 5, a conductive switching element 6 and a pair of soldering elements 7.

Figure 2:
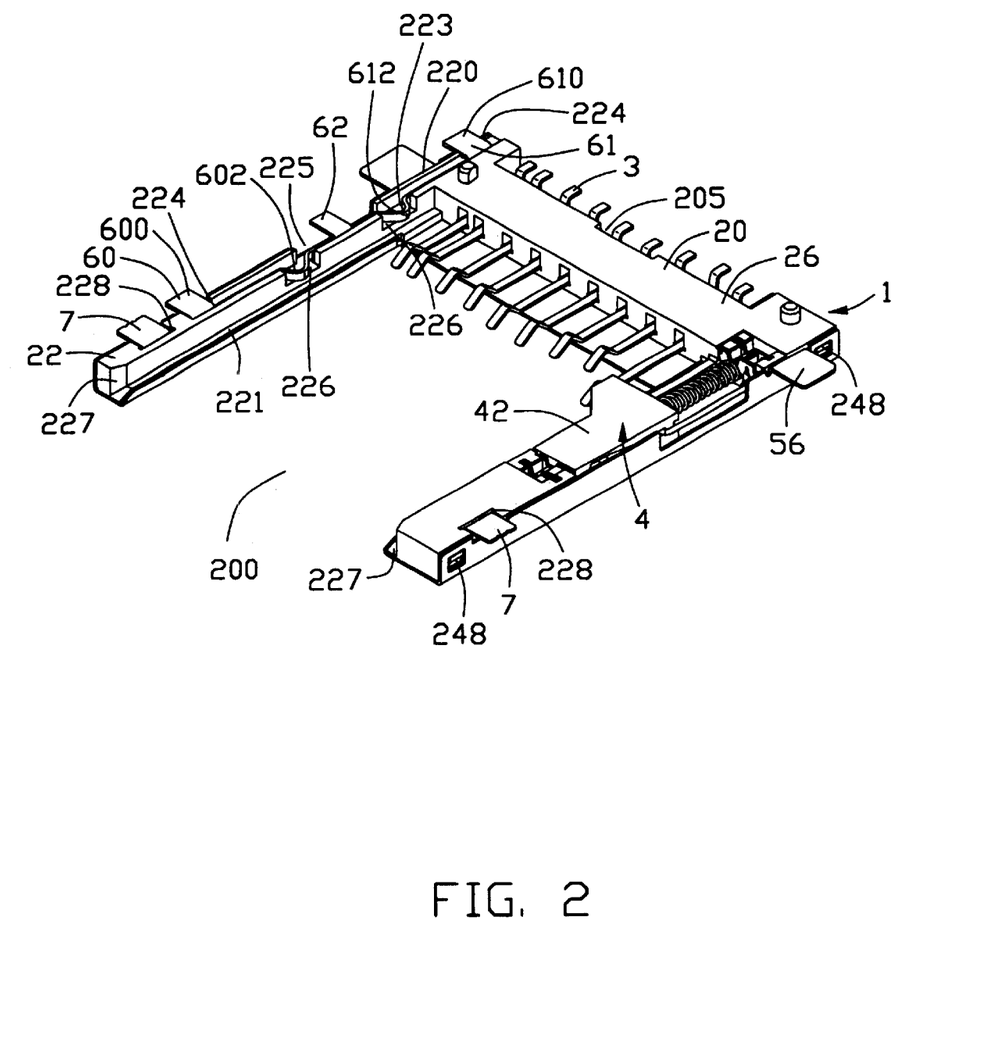
FIG. 2 is an assembled perspective view of FIG. 1.

Referring also to FIG. 2, the insulative housing 2 comprises an elongated base portion 20 and first and second parallel arms 22, 24 extending outwardly from two opposite ends of the base portion 20.

The base portion 20 forms a positioning pin 202 protruding downwardly therefrom and adjacent to the first arm 22, and defines a plurality of terminal passageways 204 extending therethrough and parallel to the first and second arms 22, 24. The base portion 20 defines a recessed section 205 in a front face thereof. The base portion 20 and the first and second arms 22, 24 define a mounting face 26 thereon and a card receiving space 200 therebetween.

The first arm 22 comprises a mounting portion 220 and a guiding portion 221 projecting inwardly from the mounting portion 220 into the card receiving space 200. The mounting portion 220 defines a receiving slit 223 extending substantially along a length thereof and recessed from the mounting face 26 thereof. The receiving slit 223 communicates with the card receiving space 200 at a pair of inner openings 226 defined through a part of the mounting portion 220 bounding an inner side of the receiving slit 223. A part of the mounting portion 220 bounding an outer side of the receiving slit 223 defines a large cutout 225 therein and a pair of shallow cutouts 224 beside two opposite ends of the large cutout 225.

Figure 3:
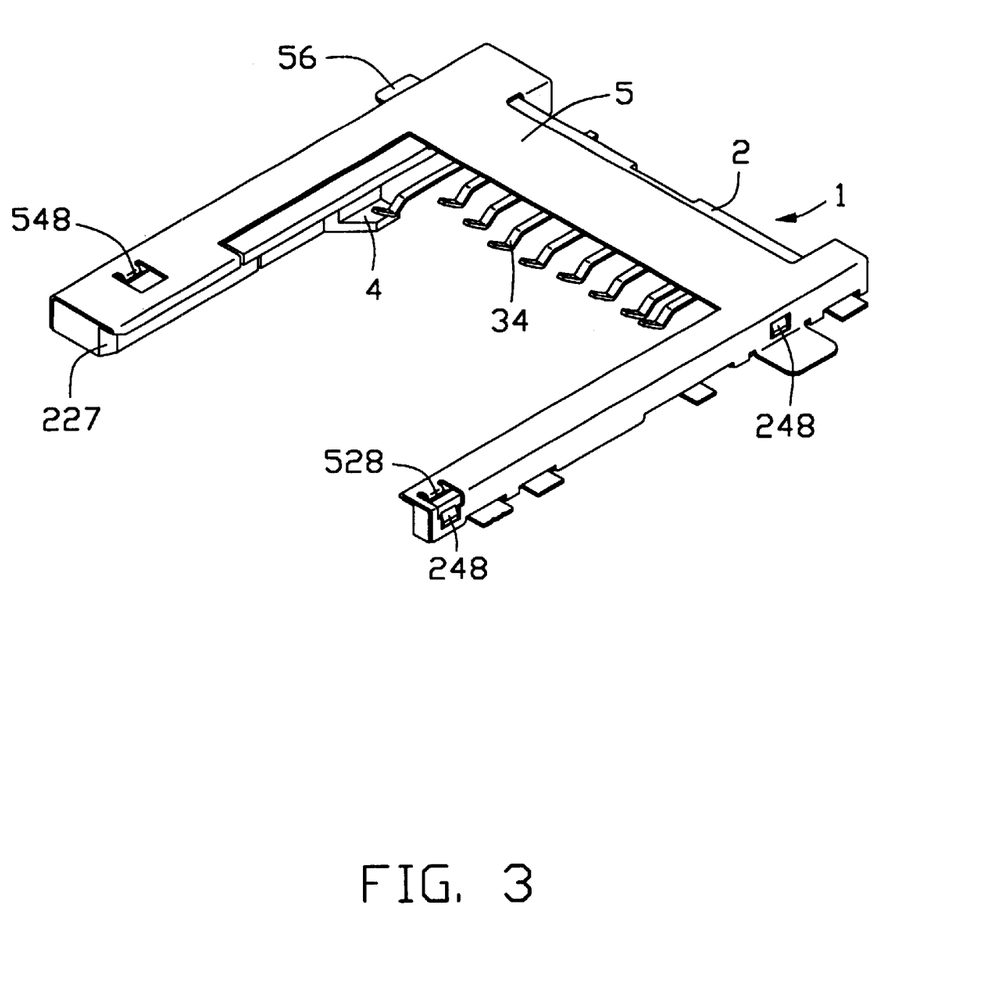
FIG. 3 is an inverted view of FIG. 2.
Figure 5:
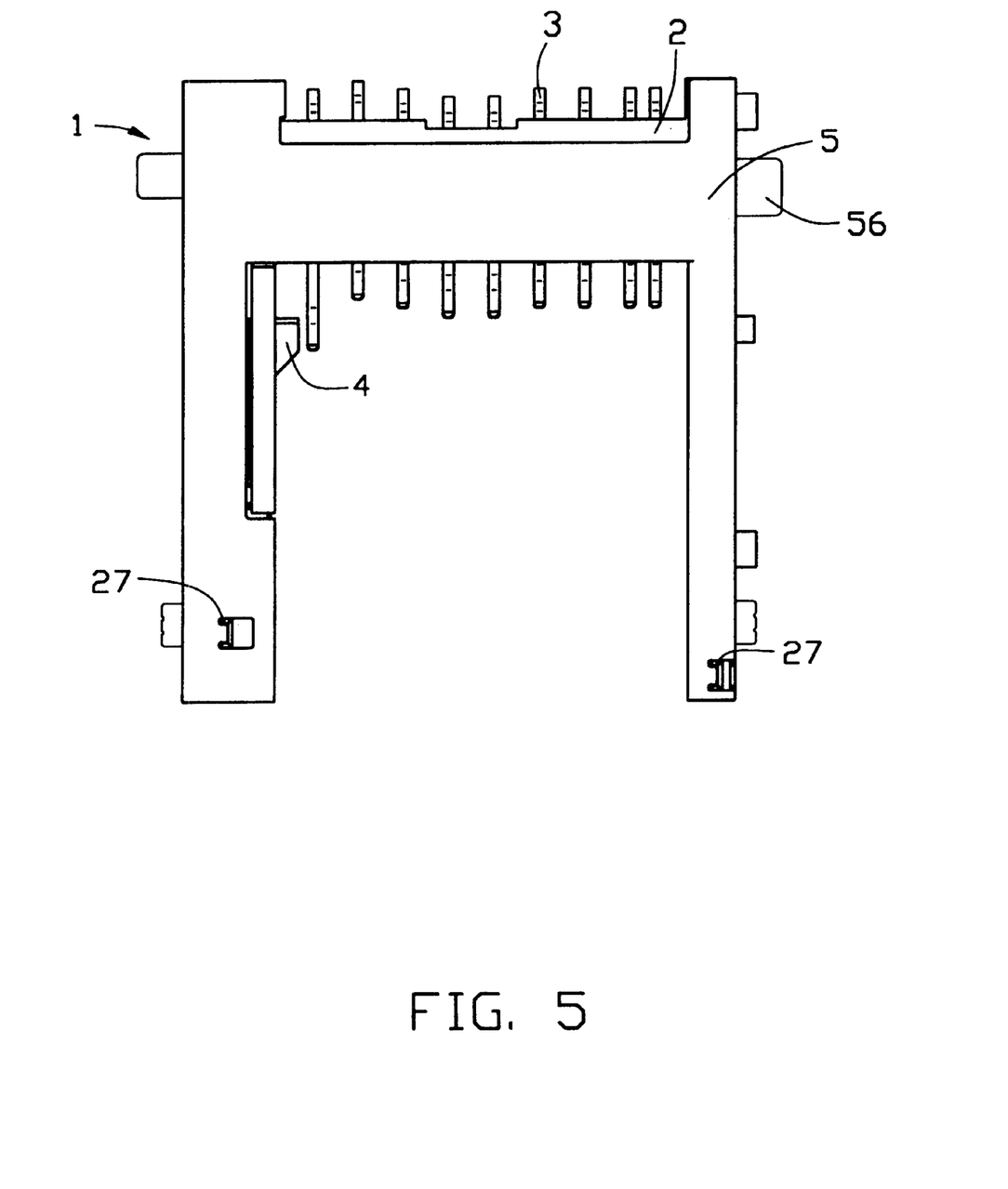
FIG. 5 is a top plan view of FIG. 4.

The first and second arms 22, 24 each forms a pair of barbs 248 (shown in FIGS. 2 and 3) protruding outwardly from an outward side thereof The first and second arms 22, 24 each defines a fixing slit 228 at an outward side of a distal end thereof, a guiding face 227 facing inwardly and rearwardly on a distal edge thereof, and an insertion slit 27 (shown in FIG. 5) in a top face opposite to the mounting face 26 thereof.

The second arm 24 comprises a first support portion 240 connecting with the base portion 20, a second support portion 242 at a distal end thereof and a connecting portion 244 connecting the first and second support portions 240, 242. The first and second support portions 240, 242 are each in the shape of a block while the connecting portion 244 is elongate and slim. A space (not labeled) is defined between the first and second support portions 240, 242 and the connecting portion 244. The first support portion 240 forms a positioning pin 249 on the mounting face 26 thereof and defines an abutting face 2401 projecting forwardly beyond the base portion 20 and facing the first arm 22. The first support portion 240 defines juxtaposed first and second grooves 243, 245 on a rear end thereof and a retention slit 241 perpendicularly communicating with the first and second grooves 243, 245. The first and second support portions 240, 242 each defines a stopping face 2440 opposite to one another. The second support portion 242 defines a first groove 243 positioned in line with the first groove 243 of the first support portion 240 and a retention slit 241 perpendicularly communicating with the first groove 243. A guiding portion 221 corresponding to the guiding portion 221 of the first arm 22 extends inward from the connecting portion 244 and from the second support portion 242.

The electrical terminals 3 each defines a mounting end 30, a curved contacting end 34 and a fixing portion 32 between the mounting and contacting ends 30, 34.

Figure 6:
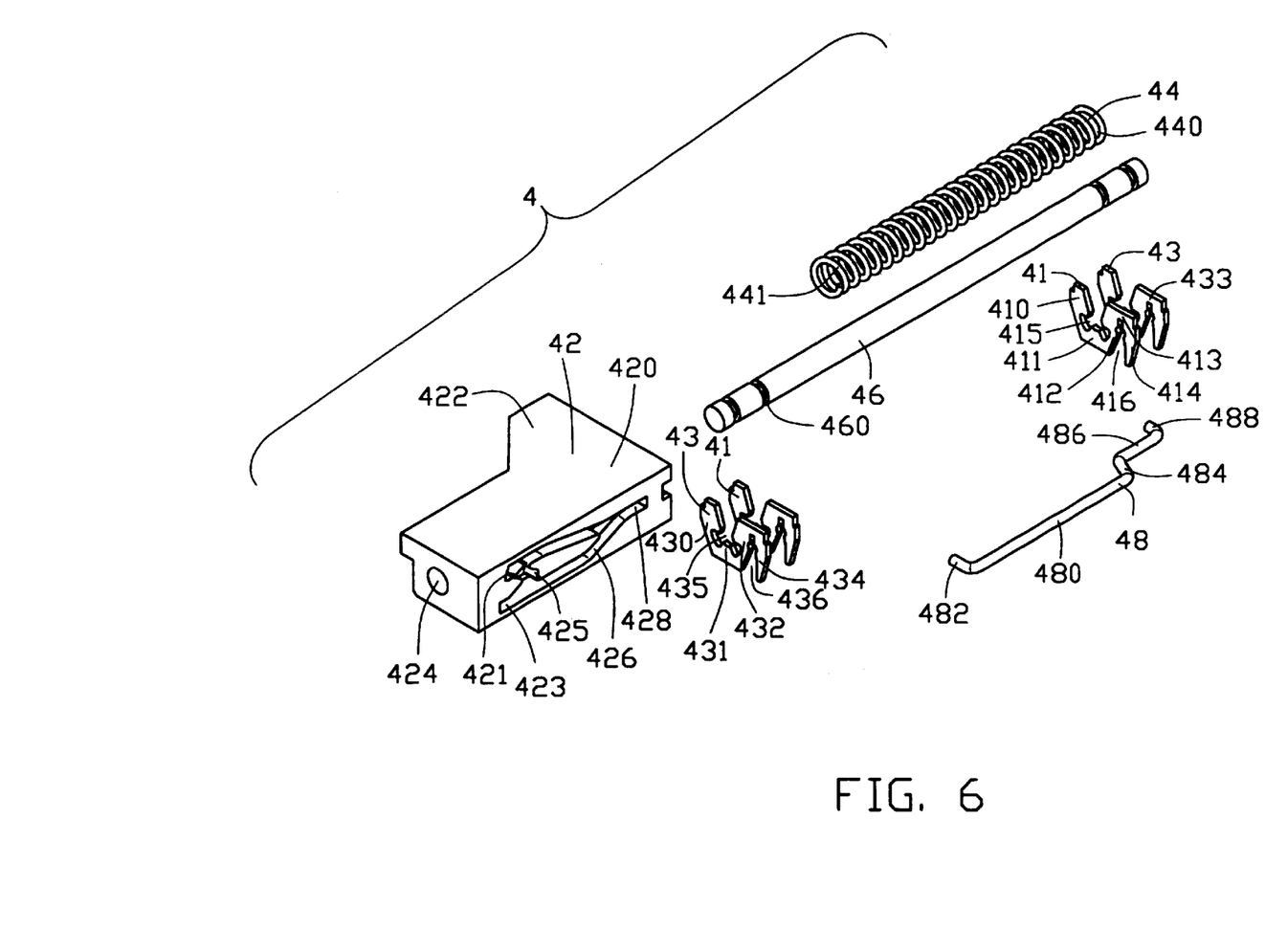
FIG. 6 is an exploded view of a card ejection element of the electrical card connector of FIG. 1.
Figure 7:
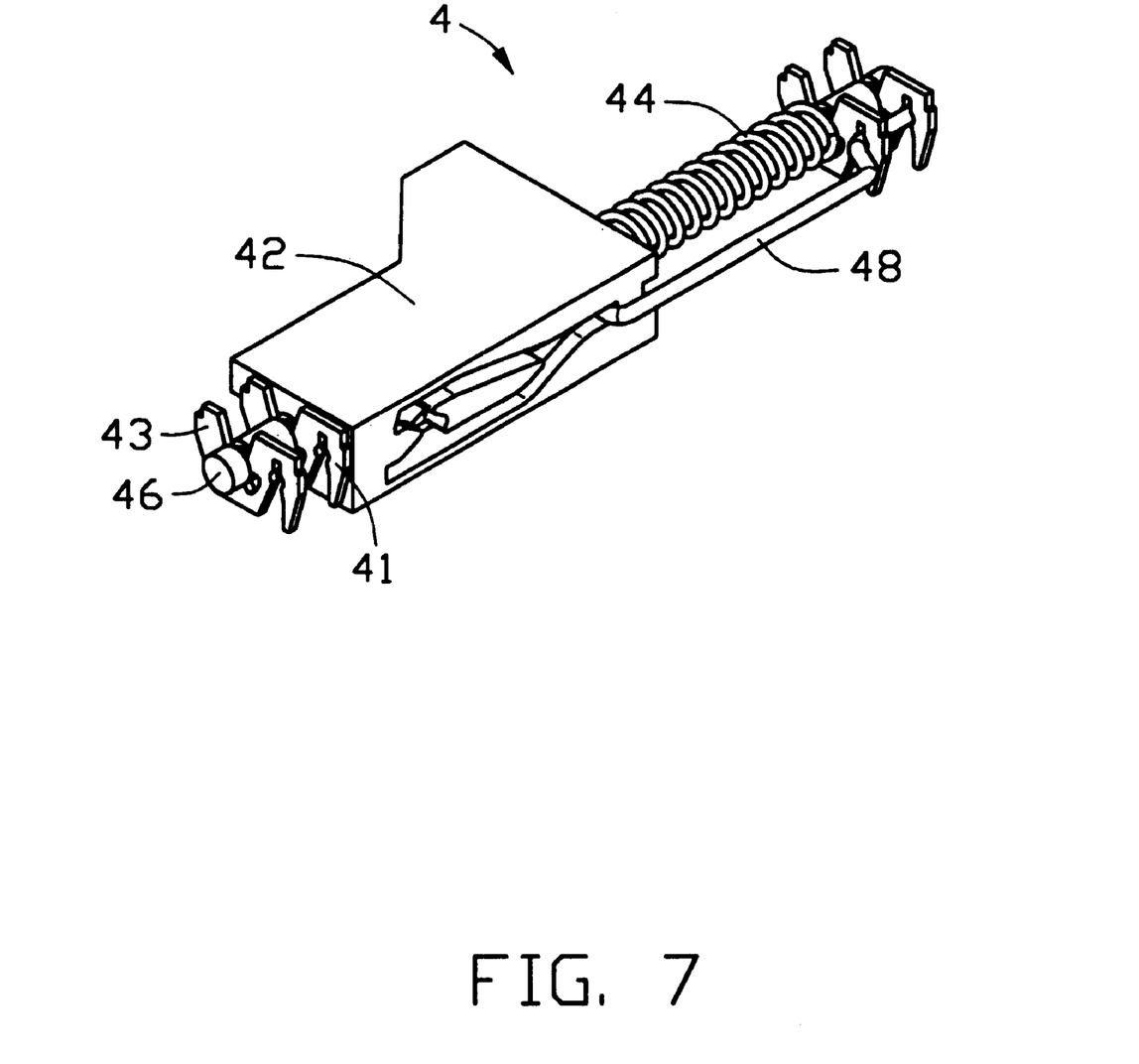
FIG. 7 is an assembled perspective view of the card ejection element of FIG. 6.

Referring also to FIGS. 6 and 7, the card ejection element 4 comprises a sliding member 42, a resilient member 44, a supporting member 46, a guiding member 48, a pair of stopping members 41 and a pair of securing members 43.

Figure 8:
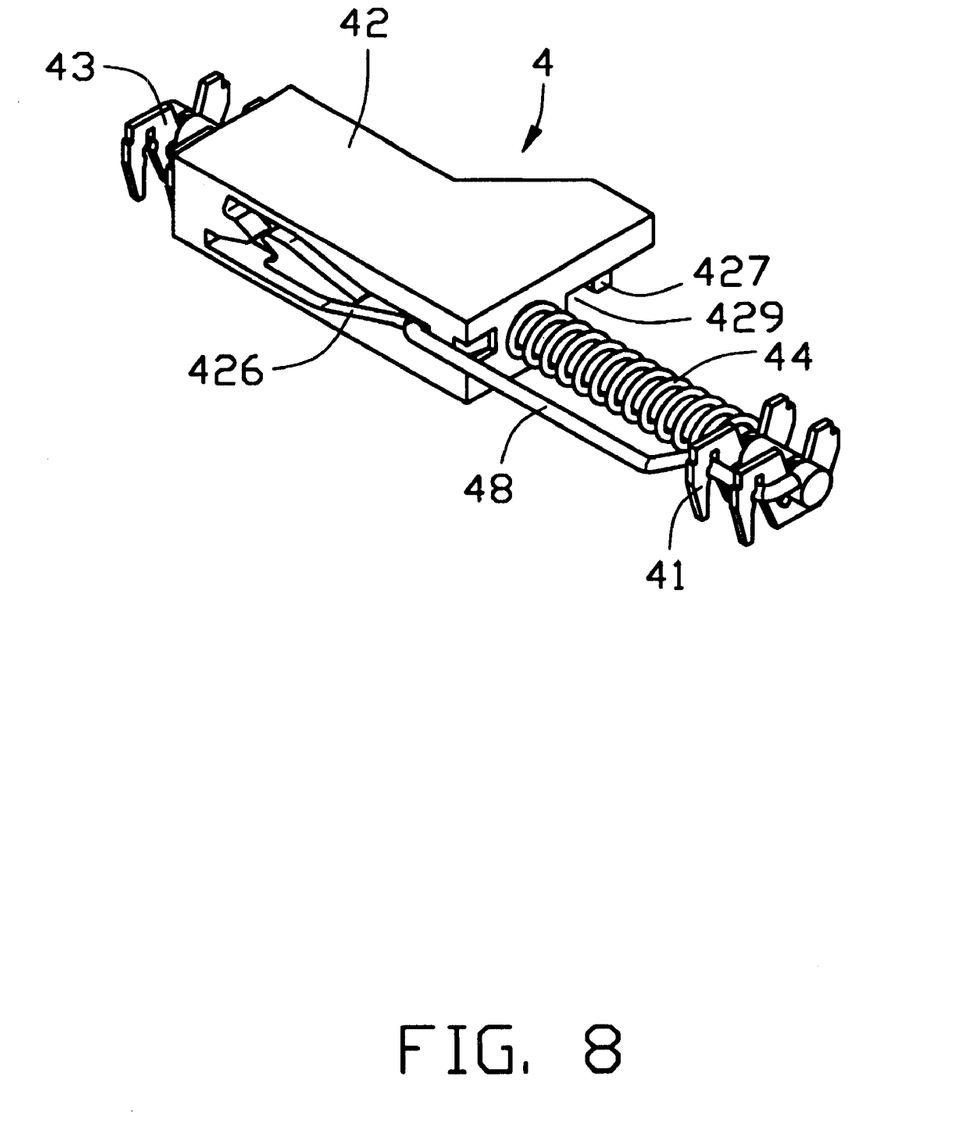
FIG. 8 is similar to FIG. 7, but taken from another perspective.
Figure 9:
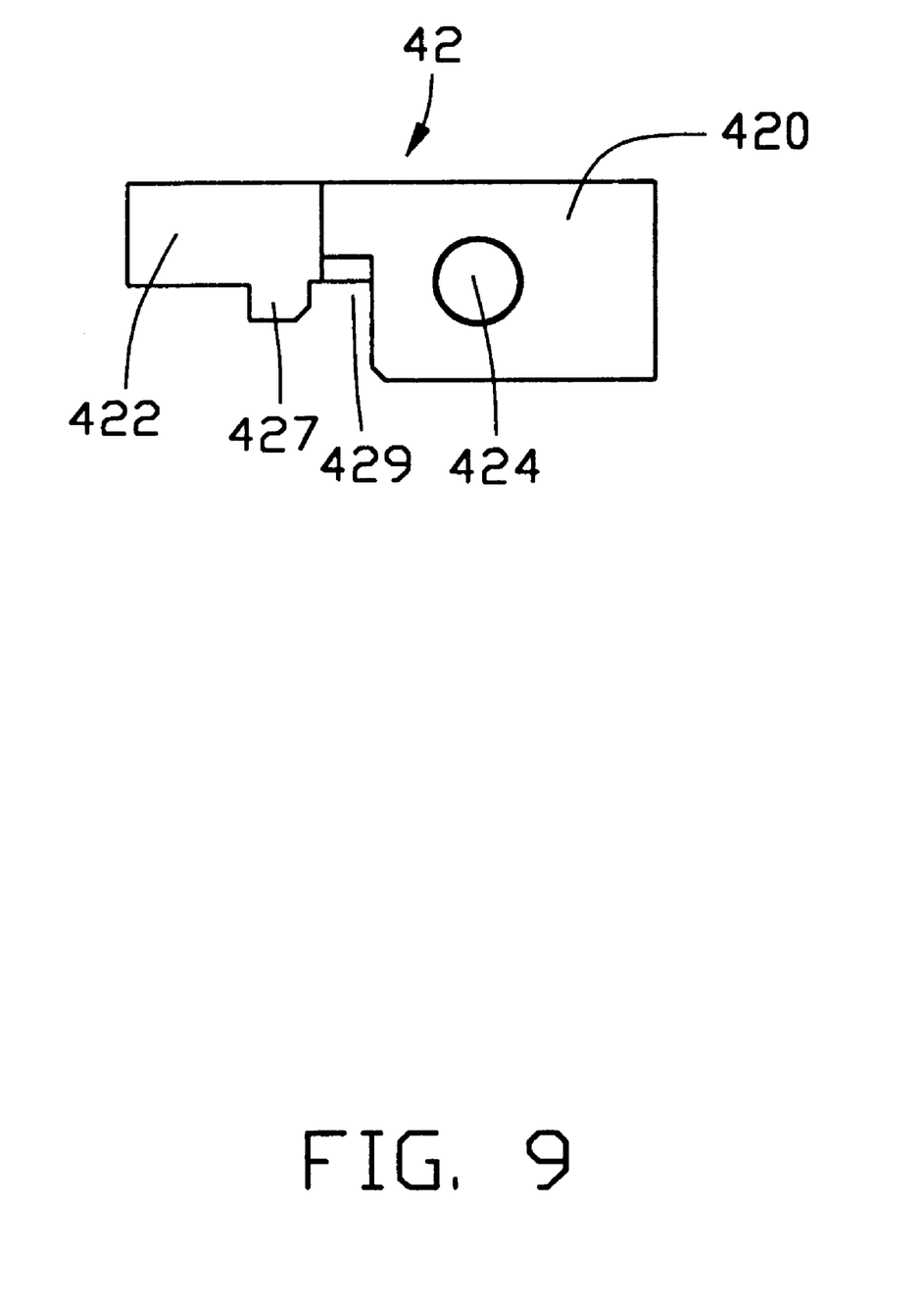
FIG. 9 is a front view of a sliding member of the card ejection element of FIG. 6.

The sliding member 42 comprises a body portion 420 and a protrusion 422 protruding laterally from a forward portion of an inner side of the body portion 420. The body portion 420 defines a hole 424 extending through a whole length thereof and a recess 426 in an outer side thereof. The recess 426 defines first, second and third turning points 428, 421, 423 therein. An island (not labeled) defining a fourth turning point 425 therein is formed in the recess 426. Referring also to FIGS. 8 and 9, the protrusion 422 forms a rib 427 on a lower side thereof and defines a slot 429 between the rib 427 and the body portion 420.

The resilient member 44 is a spiral spring and comprises a stopping end 440 and an abutting end 441 opposite to the stopping end 440.

The supporting member 46 is a longitudinal, cylindrically-shaped rod and defines a pair of circular slots 460 on each of two opposite ends thereof.

The guiding member 48 comprises a first longitudinal portion 480, a tailing end 482 extending rearwardly at an angle from a rearward end of the first longitudinal portion 480, a turning portion 484 extending forwardly at an angle from a forward end of the first longitudinal portion 480, a second longitudinal portion 486 extending forwardly from a forward end of the turning portion 484 and being parallel to the first longitudinal portion 480, and a heading end 488 extending forwardly at an angle from a forward end of the second longitudinal portion 486.

The stopping members 41 are similar in shape to the securing members 43. Each of the stopping and securing members 41, 43 comprises a first standing portion 410, 430, a first laying portion 411, 431, a second standing portion 412, 432, a second laying portion 413, 433 and a third standing portion 414, 434. The first and second standing portions 410, 430, 412, 432 and the first laying portion 411, 431 define a first retention opening 415, 435 therebetween and the second and third standing portions 412, 432, 414, 434 and the second laying portion 413, 433 define a second retention opening 416, 436 therebetween.

Referring to FIG. 1, the conductive shield 5 comprises a first and second arm plates 52, 54 and a base plate 50 extending laterally therebetween. The first and second arm plates 52, 54 each comprises a major face 520, 540 and first and second flanges 521, 541, 522, 542 extending downwardly from opposite longitudinal edges of the major face 520, 540, respectively. The first flange 521 of the first arm plate 52 defines a pair of shallow cutouts 523 corresponding to the shallow cutouts 224 of the insulative housing 2, and a large cutout 524 corresponding to the large cutout 225 of the insulative housing 2. The first flanges 521, 541 of the first and second arm plates 52, 54 each comprises an outward tongue 56 projecting from a bottom edge thereof and defines a concave 525 at a distal bottom edge thereof. The first flange 541 of the second arm plate 54 defines two through holes 526 therein. The first flange 521 of the first arm plate 52 defines a through hole 526 and a corner hole 527 therein. The corner hole 527 extends through the first flange 521 and the major face 520. A downward tongue 528 extends downwardly from an inner edge of the corner hole 527. The major face 540 of the second arm plate 54 defines a holding hole 547 therein. A downward tongue 548 extends downwardly from an outside edge of the holding hole 547. An abutting piece 546 extends parallel to the first flange 541 and downwardly from a front and inward edge of the major face 540 of the second arm plate 54. The first flange 541 of the second arm plate 54 further defines a window 544 thereon.

Figure 4:
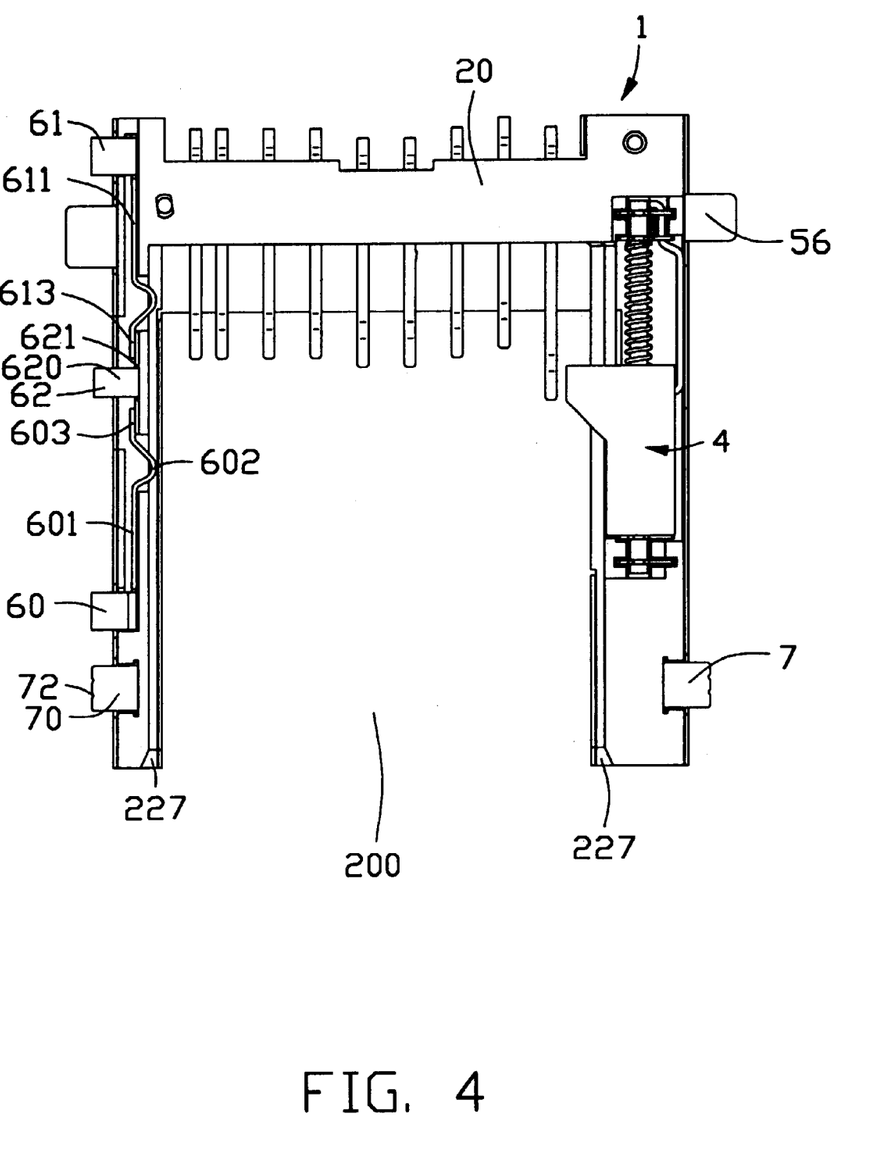
FIG. 4 is a bottom plan view of the electrical card connector of FIG. 1.

Referring to FIGS. 1, 2 and 4, the switching element 6 comprises a first switch contact 60, a second switch contact 61 and a third switch contact 62. The first switch contact 60 is similar in shape to the second switch contact 61. Each of the first and second switch contacts 60, 61 comprises a soldering portion 600, 610, a longitudinal retaining portion 601, 611 perpendicular to the soldering portion 600, 610, a curved portion 602, 612 extending from the retaining portion 601, 611, and an engaging portion 603, 613 extending further from the curved portion 602, 612. The third switch contact 62 comprises a mounting pad 620 and an engaging pad 621 perpendicular to the mounting pad 620.

Referring to FIG. 1, the soldering elements 7 each comprises a solder pad 70 and a fixing pad 71 perpendicularly extending from the solder pad 70. The solder pad 70 defines a plurality of indentations 72 on a distal edge thereof.

In assembly, the electrical terminals 3 are inserted through the terminal passageways 204 in the base portion 20 with the fixing portions 32 being retained by the base portion 20 and the curved contacting ends 34 protruding rearwardly into the card receiving space 200. The mounting ends 30 of the electrical terminals 3 depend from the front face of the base portion 20 with tail ends (not labeled) thereof being flush with the mounting face 26 and at least some of the mounting ends 30 being received in the recessed portion 205, so that the tail ends of the mounting ends 30 are not in line with each other in a side-to-side direction. The contacting ends 34 of the electrical terminals 3 are also not in line with each other in a side-to-side direction.

The retaining portions 601, 611 of the first and second switch contacts 60, 61 are retained in the receiving slit 223 of the first arm 22, the soldering portions 600, 610 extending outwardly from the shallow cutouts 224 to be flush with the mounting face 26, and the curved portions 602, 612 protruding through the inner openings 226 into the card receiving space 200. The engaging pad 621 of the third switch contact 62 is retained in the receiving slit 223 and engages with the engaging portions 603, 613 of the first and second switch contacts 60, 61. The engaging portions 603, 613 of the first and second switch contacts 60, 61 are located opposite to the large cutout 225, therefore being outwardly movable therethrough.

The fixing pads 71 of the soldering elements 7 are received in the fixing slits 228 of the first and second arms 22, 24 with the solder pads 70 being flush with the mounting face 26 of the insulative housing 2. To assemble the card ejection element 4 together, the first receiving openings 415, 435 of the forward stopping and securing members 41, 43 receive a front end of the supporting member 46 therein so as to be secured to the two forward circular slots 460 of the supporting member 46. A rear end of the supporting member 46 is inserted longitudinally through the resilient member 44 until the stopping end 440 of the resilient member 44 abuts against the forward stopping member 41. The rear end of the supporting member 46 is then inserted through the hole 424 of the sliding member 42 so that the abutting end 441 of the resilient member 44 abuts against the sliding member 42. Then the rearward stopping and securing members 41, 43 are assembled to the rear end of the supporting member 46 so that the sliding and resilient members 42, 44 are retained between the forward and rearward stopping members 41.

The second longitudinal portion 486 of the guiding member 48 is secured in the second receiving openings 416, 436 of the forward stopping member 41 and the forward securing member 43, and the heading end 488 is retained against the second standing portion 432 of the forward securing member 43. The tailing end 482 of the guiding member 48 is received in the recess 426 and initially rests at the first turning point 428. The first longitudinal portion 480 is parallel to the supporting member 46.

To assemble the card ejection element 4 to the electrical card connector 1, the first laying portions 431 of the securing members 43 are received in the retention slits 241 of the second arm 24 of the insulative housing 2. The second longitudinal portion 486 and the heading end 488 of the guiding member 48 extend into the second groove 245 of the first support portion 240 while the front end of the supporting member 46 proximate to the heading end 488 of the guiding member 48 extends into the first groove 243 of the first support portion 240. The rear end of the supporting member 46 extends into the first groove 243 of the second support portion 242. The pair of stopping members 41 abut against stopping faces 2440 of the first and second support portions 240, 242. The protrusion 422 of the sliding member 42 protrudes into the card receiving space 200. The rib 427 (FIG. 8) is supported by the guiding portion 221 of the second arm 24 and the slot 429 (FIG. 8) partially receives the connecting portion 244.

The base plate 50 and the first and second arm plates 52, 54 of the conductive shield 5 substantially enclose the base portion 20 and the first and second arms 22, 24 of the insulative housing 2, respectively, except for the mounting face 26 of the insulative housing 2. The downward tongues 528, 548 of the conductive shield 5 extend into the insertion slits 27 of the insulative housing 2 and the through holes 526 and the corner hole 527 receive the barbs 248 to provide a reliable retention therebetween. The soldering portions 600, 610 of the first and second switch contacts 60, 61, the mounting pad 620 of the third switch contact 62 and the solder pads 70 of the soldering elements 7 extend outwardly from the shallow cutouts 523, the large cutout 524 and the concaves 525 of the first flanges 521, 541 of the first and second arm plates 52, 54 to be flush with the mounting face 26 of the insulative housing 2.

Figure 10:
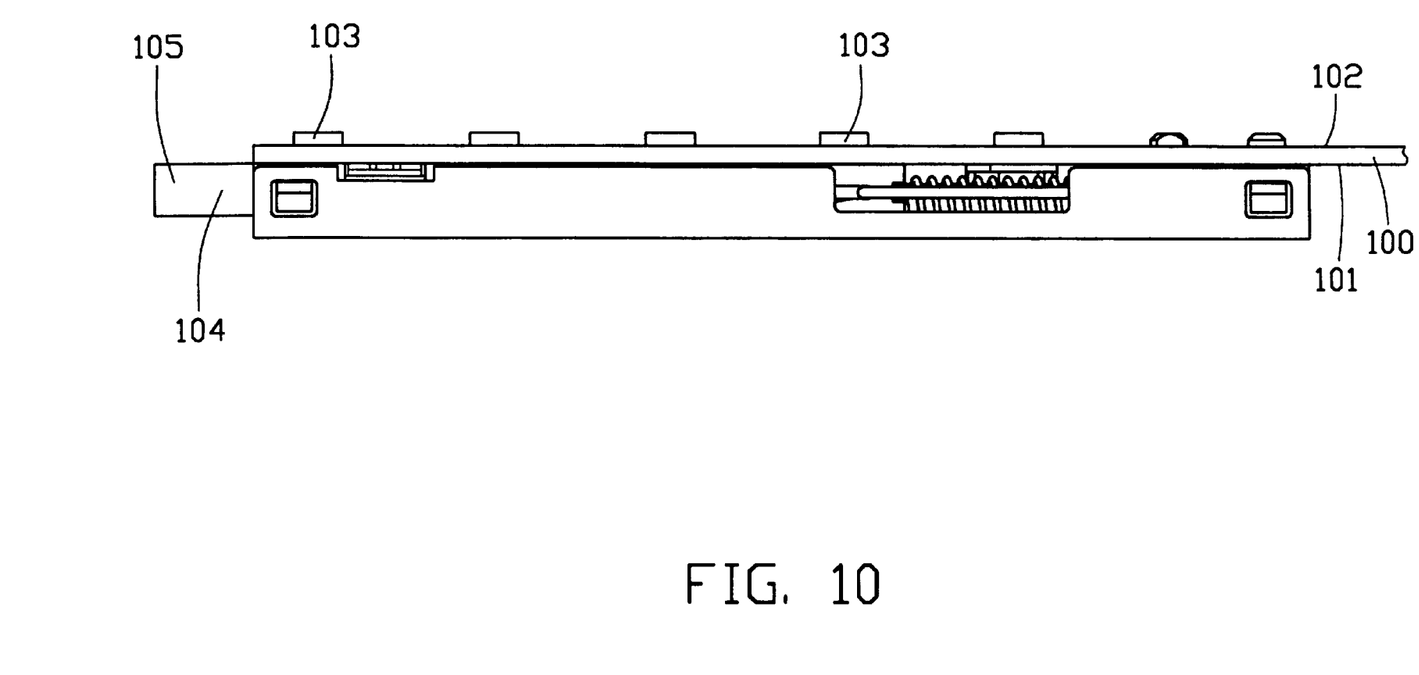
FIG. 10 is a side view showing an application of the electrical card connector in accordance with the present invention.

In use, the positioning pins 202, 249 of the insulative housing 2 are inserted into holes defined in a printed circuit board 100 (FIG. 10) to mount the electrical card connector 1 to a bottom face 101 of the printed circuit board 100, wherein the printed circuit board 100 has a top face 102 to which a plurality of electronic components 103 are soldered. The soldering portions 600, 610 of the first and second switch contacts 60, 61, the mounting pad 620 of the third switch contact 62, the solder pads 70 of the soldering elements 7, the outward tongues 56 of the conductive shield 5, and the mounting ends 30 of the electrical terminals 3 are soldered to the printed circuit board 100. The printed circuit board 100 functions as a roof of the electrical card connector 1. The indentations 72 of the soldering elements 70 help secure the electrical card connector 1 more reliably to the printed circuit board 100. An electronic card 104 (FIG. 10) is inserted into the card receiving space 200, guided by the guiding faces 227 and the guiding portions 221 of the first and second arms 22, 24 before being stopped by the protrusion 422 of the sliding member 42. The electronic card 104 abuts directly against the printed circuit board 100, if desired. A first pushing force is applied to a rear edge 105 of the electronic card 104 to force the sliding member 42 to move forwardly and to compress the resilient member 44 until the sliding member 42 reaches an end position. The first pushing force is then removed. During this movement, the tailing end 482 of the guiding member 48 moves from the first turning point 428 via the second turning point 421 to rest at the fourth turning point 425 of the recess 426 defined in the sliding member 42. The curved portions 602, 612 of the first and second switch contacts 60, 61 are pressed outwardly by the electronic card to disengage the engaging portions 603, 613 from the engaging pads 621 of the third switch contact 62. The contacting ends 34 of the electrical terminals 3 engage with contact pads (not shown) of the electronic card 104, so that the electronic card 104 is electrically connected with the printed circuit board 100. When a second pushing force is applied to the rear edge of the electronic card, the tailing end 482 of the guiding member 48 moves from the fourth turning point 425 to the third turning point 423. When the second pushing force is removed, a spring force provided by the resilient member 44 pushes the sliding member 42 to its original position where the tailing end 482 of the guiding member 48 rests at the first turning point 428, whereby the electronic card 104 is pushed rearwardly and can be easily pulled out of the card receiving space 200.

The electronic card 104 received in the card receiving space 200 may abut directly against the bottom face 101 of the printed circuit board 100, so the thickness of the electrical card connector 1 is effectively reduced. The sideward arrangement of the sliding member 42 and the guiding member 48 further reduces the thickness of the electrical card connector 1. The operation of the card ejection element 4 is observable through the window 544 of the conductive shield 5 and is in a direction parallel to the insertion and/or ejection of the electronic card 104, so operation is not so readily obstructed and so is more reliable.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed. For example, arranged in a reverse manner, the recess 426 may be formed on the base portion 20 instead of on the sliding member 42, and the guiding member 48 may be immoveably secured to the sliding member 42 and moveable relative to the base portion 20 rather than to the sliding member 42.

What is claimed is:

1. An electrical card connector for being mounted on a printed circuit board and for receiving an electronic card therein, comprising:

an insulative housing mounted on the printed circuit board, the insulative housing comprising a longitudinal base portion and parallel first and second arms extending from two opposite ends of the base portion, the base portion and the first and second arms together defining a card receiving space to accommodate therebetween the electronic card, the electronic card directly abutting against the printed circuit board; and a plurality of electrical terminals extending parallel to the first and second arms, each electrical terminal comprising a fixing portion retained in the base portion, a mounting end extending from an end of the fixing portion and beyond the base portion, and a contacting end extending from an opposite end of the fixing portion and beyond the base portion, the mounting ends being staggered relative to one another in a lateral direction and the contacting ends being staggered relative to one another in the lateral direction.

2. The electrical card connector as claimed in claim 1 further comprising a card ejection element comprising a supporting member, a sliding member and a resilient member supported by the supporting member, a guiding member partially received in the sliding member, and a pair of securing members securing the card ejection element to the second arm of the insulative housing.

3. The electrical card connector as claimed in claim 2, wherein each securing member comprises a first standing portion, a first laying portion, a second standing portion, a second laying portion and a third standing portion, the first and second standing portions and the first laying portion defining a first receiving opening securing the supporting member therethrough and the second and third standing portions and the second laying portion defining a second receiving opening therebetween.

4. The electrical card connector as claimed in claim 3, wherein the second arm of the insulative housing comprises a first support portion, a second support portion and a connecting portion between the first and second support portions, the first and second support portions each defining a retention slit securing the first laying portions of the securing members.

5. The electrical card connector as claimed in claim 4, wherein the first and second support portions each defines a first groove perpendicularly communicating with the retention slit and receiving one end of the supporting member therein.

6. The electrical card connector as claimed in claim 5, wherein the guiding member comprises a first longitudinal portion parallel to the supporting member, a tailing end extending from a rear end of the first longitudinal portion, a turning portion extending from a front end of the first longitudinal portion opposite to the tailing end, a second longitudinal portion extending from a front end of the turning portion and parallel to the first longitudinal portion, and a heading end extending from the second longitudinal portion, the second longitudinal portion extending through the second receiving opening of the securing member secured to the first support portion and the heading end abutting against the second standing portion of the same securing member.

7. The electrical card connector as claimed in claim 6, wherein the first support portion defines a second groove parallel to the first groove and perpendicularly communicating with the retention slit, the second groove together with the retention slit receiving the second longitudinal portion and the heading end of the guiding member.

8. The electrical card connector as claimed in claim 7, wherein the sliding member comprises a body portion and a protrusion protruding from one side of the body portion into the card receiving space and partially supported by the connecting portion of the second arm.

9. The electrical card connector as claimed in claim 8, wherein the body portion of the sliding member defines a hole along a whole length thereof for the supporting member to extend therethrough and a recess at a side opposite to the protrusion to receive the tailing end of the guiding member therein.

10. The electrical card connector as claimed in claim 9, wherein the recess comprises a first, second and third turning points therein and an island formed therein, the island defining a fourth turning point therein and the tailing end of the guiding member being movable between the first through fourth turning points.

11. The electrical card connector as claimed in claim 4, wherein the first and second support portions each defines a stopping face facing toward each other, and the card ejection element comprises a pair of stopping members abutting against the stopping faces and confining the resilient member and the sliding member therebetween.

12. The electrical card connector as claimed in claim 1 further comprising similar first and second switch contacts and a third switch contact, and the third switch contact comprising a mounting pad and an engaging pad, the first and second switch contacts each comprising a soldering portion for mounting to the printed circuit board, a retaining portion, a curved portion protruding into the card receiving space, and an engaging portion engageable with the engaging pad of the third switch contact.

13. The electrical card connector as claimed in claim 12, wherein the first arm defines a receiving slit for retaining the retaining portions of the first and second switch contacts and the engaging pad of the third switch contact.

14. The electrical card connector as claimed in claim 1 further comprising a pair of soldering elements each comprising a solder pad and a fixing pad, and wherein the first and second arms each defines a fixing slit for receiving the fixing pad therein.

15. An electrical card connector comprising:

an insulative housing comprising a longitudinal base portion and parallel first and second arms extending from two opposite ends of the base portion, the base portion and the first and second arms defining a card receiving space therebetween;

a plurality of electrical terminals retained in the base portion of the insulative housing; and a card ejection element comprising a supporting member, a sliding member and a resilient member supported by the supporting member, a guiding member partially received in the sliding member and a securing member securing the card ejection element to one of the first and second arms.

16. The electrical card connector as claimed in claim 15, wherein the card ejection element further comprises a pair of stopping members confining the sliding member and the resilient member therebetween.

17. The electrical card connector as claimed in claim 16, wherein the resilient member is a spiral spring and the supporting member is inserted longitudinally through the spiral spring.

18. The electrical card connector as claimed in claim 17 further comprising a switching element assembled to the first arm of the insulative housing and comprising first, second and third switch contacts engaged with each other before an electronic card is inserted into the card receiving space.

19. A combination of an electrical card connector, a printed circuit board and an electronic card, comprising:

an electrical card connector;

a printed circuit board having a bottom face to which the electrical card connector is soldered and a top face on which a plurality of electronic components are mounted, the printed circuit board functioning as a roof of the electrical card connector;

an electronic card received in the electrical card connector and electrically connecting with the electrical card connector; and an ejecting means fixed to the electrical card connector and for ejecting the electronic card to electrically disengage with the electrical card connector when an edge of the electronic card distant from an electrical connection between the electronic card and the electrical card connector is subject to a pushing force.

20. An electrical card connector assembly comprising:

an insulative housing defining, a longitudinal base with a plurality of terminals therein;

a pair of arms extending at two opposite ends of the base in a front-to-back direction thereof;

the base and the pair of arms together defining a card receiving space therebetween in which a card is inserted; and a card ejection element mounted on one of said pair of arms, said card ejection element including a sliding member with a protrusion inwardly laterally extending into the receiving space and intervening with a path along which the card moves and adapted to engage said inserted card for being inward moved by and with said inserted card or for outwardly moving with and ejecting said inserted card; wherein said sliding member is moveable back and forth in said front-to-back direction, and a resilient member constantly urges said sliding member in a direction opposite to said front-to-back direction.

21. The connector as claimed in claim 20, wherein said ejection element further includes a guiding member cooperating with a recess formed on one of said sliding member or the base, and wherein the sliding member is in either an inner position with the inserted card in said card receiving space, or an outer position where the sliding member is urged outwardly by said resilient member with said inserted card.

22. An electrical card connector for use with a card, comprising:

an insulative housing defining a longitudinal base with a plurality of terminals therein;

a pair of arms extending at two opposite ends of the base in a front-to-back direction thereof;

the base and the pair of arms together defining a card receiving space therebetween for receiving said card therein; and a card ejection element mounted on one of said pair of arms, said card ejection element including a sliding member with a protrusion inwardly laterally extending into the receiving space and intervening with a path along which the card moves and adapted to engageably move with said inserted card; wherein said sliding member is moveable back and forth in said front-to-back direction, and a resilient member constantly urges said sliding member in a direction opposite to said front-to-back direction, and wherein said ejection element further includes a guiding member controlling the sliding member to be in either an inner position or an outer position for correspondingly determining mutually exclusive receipt or ejection of said card with regard to the connector.

* * * * *